United States Patent [19]

Davis, Jr.

[11] Patent Number: 5,291,846
[45] Date of Patent: Mar. 8, 1994

[54] AMPHIBIOUS MOBILITY ASSIST VEHICLE FOR MOBILITY IMPAIRED PERSONS

[76] Inventor: Frederick B. Davis, Jr., 2305 Batten Rd., Brooksville, Fla. 34601

[21] Appl. No.: 22,264

[22] Filed: Feb. 25, 1993

[51] Int. Cl.⁵ ............................................. B63B 35/00
[52] U.S. Cl. ..................................... 114/270; 114/61
[58] Field of Search ................. 114/270, 363, 357; 441/129, 130; 296/65.1

[56] References Cited

U.S. PATENT DOCUMENTS

| | | |
|---|---|---|
| 2,501,750 | 3/1950 | Warner . |
| 2,606,519 | 8/1952 | Branco ............................. 114/270 |
| 2,960,056 | 11/1960 | Puccinelli ......................... 114/270 |
| 2,998,798 | 9/1961 | Love . |
| 3,102,280 | 9/1963 | Williams . |
| 3,324,488 | 6/1967 | Schulz, Jr. . |
| 4,311,108 | 1/1982 | Horton .............................. 114/61 |
| 4,500,297 | 2/1985 | Boulva .............................. 440/27 |
| 4,700,648 | 10/1987 | Trefethern et al. ................ 114/61 |
| 4,768,454 | 9/1988 | Selken .............................. 114/61 |
| 4,925,229 | 5/1990 | Siebler ............................ 296/65.1 |

FOREIGN PATENT DOCUMENTS

743630 1/1933 France .

Primary Examiner—Jesus D. Sotelo
Attorney, Agent, or Firm—Brady, O'Boyle & Gates

[57] ABSTRACT

An amphibious mobility assist vehicle for mobility impaired persons wherein a main flotation body has a catamaran configuration of twin hulls and constructed of molded thermoplastic material filled with plastic foam material of closed cell construction. A pair of conventional wheelchair-type wheels are detachably connected to the rear portion of the main flotation body on each side of a seat portion thereof, and a pair of hollow, spherical, flotation, caster mounted wheels are connected to the front of each hull. A manually actuated lift mechanism, which is accessible to the occupant of the vehicle, is connected to each spherical wheel so that the spherical wheels can be individually moved from a ground engaging position to an elevated position when the vehicle is floating in a body of water.

17 Claims, 7 Drawing Sheets

FIG. 9

AMPHIBIOUS MOBILITY ASSIST VEHICLE FOR MOBILITY IMPAIRED PERSONS

BACKGROUND OF THE INVENTION

In order that mobility impaired persons could expand their activity to outdoor recreation and therapy, particularly aquatic sports, such as water polo, Applicant developed the aquatic wheelchair as disclosed in his U.S. Pat. No. 4,926,777.

In his continuing research and development to provide an improved amphibious mobility assist vehicle for mobility impaired persons, the rough terrain amphibious vehicle of the present invention has been devised to provide transportation through sand, as well as mobility in and through water, to thereby facilitate access to aquatic environments, such as lakes and beaches, whereby outdoor recreation and therapy for mobility impaired persons can be further expanded to include fishing, kayaking, sailing, or merely lounging in the water and on the beach.

SUMMARY OF THE INVENTION

The amphibious mobility assist vehicle of the present invention comprises, essentially, a main flotation body having a catamaran configured shell constructed of polyethylene, or other suitable thermoplastic material, filled with a closed cell foam. A pair of conventional wheelchair-type wheels are detachably connected to the rear portion of the main flotation body on each side thereof, and a pair of hollow, spherical, caster mounted wheels are connected to the front of the main flotation body portion on each side thereof, whereby the mobility of the vehicle over sand and other rough terrain is facilitated.

A manually actuated lift mechanism is operatively connected to each spherical wheel, whereby the spherical wheels can be moved to an elevated position when the vehicle is floating in water.

A seat having a foldable back rest is provided in the rear portion of the main flotation body between the rear wheels and suitable handles are integrally formed on the front and rear of the main flotation body to facilitate manually pulling the vehicle, such as over soft sand, and the like.

DESCRIPTION OF THE PREFERRED EMBODIMENT

Figure 1:
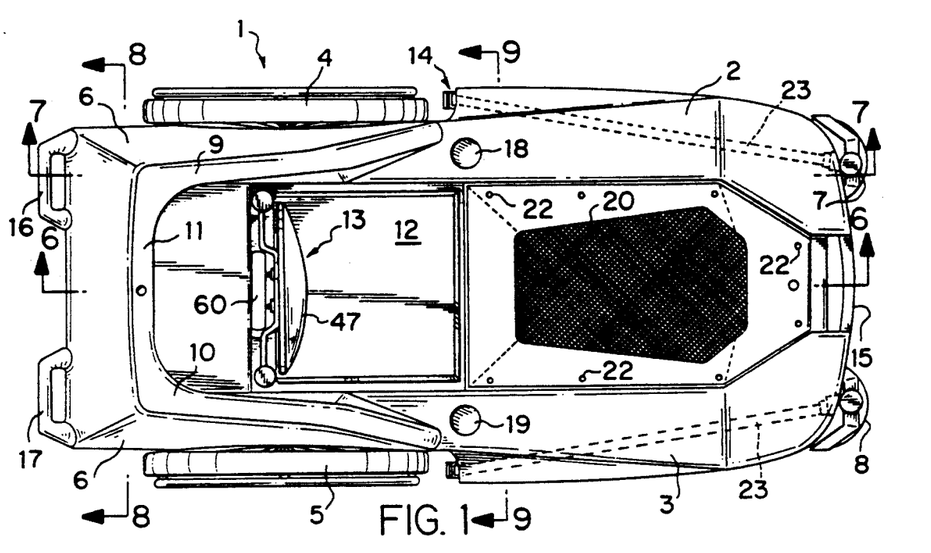
FIG. 1 is a top plan view of the mobility assist vehicle of the present invention.
Figure 2:
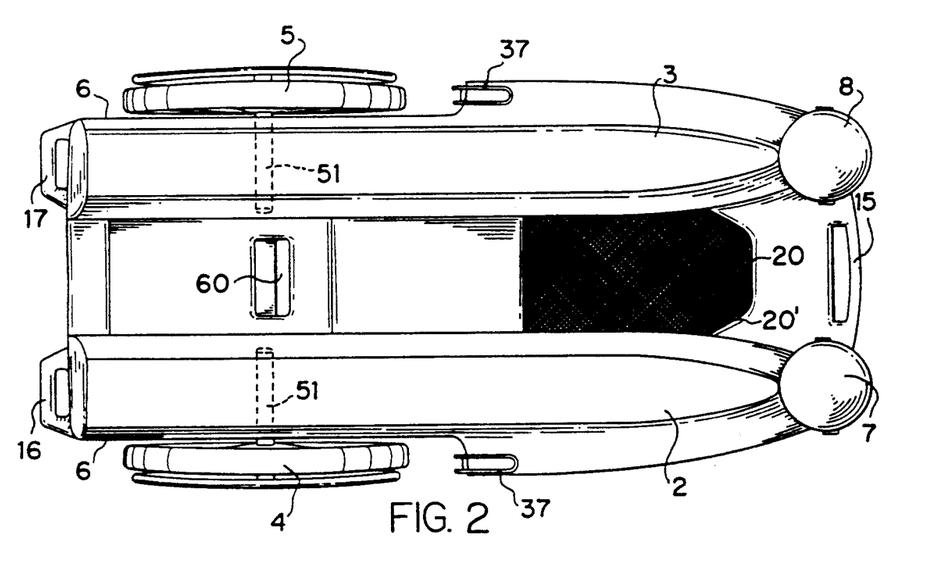
FIG. 2 is a bottom plan view of the vehicle.
Figure 3:
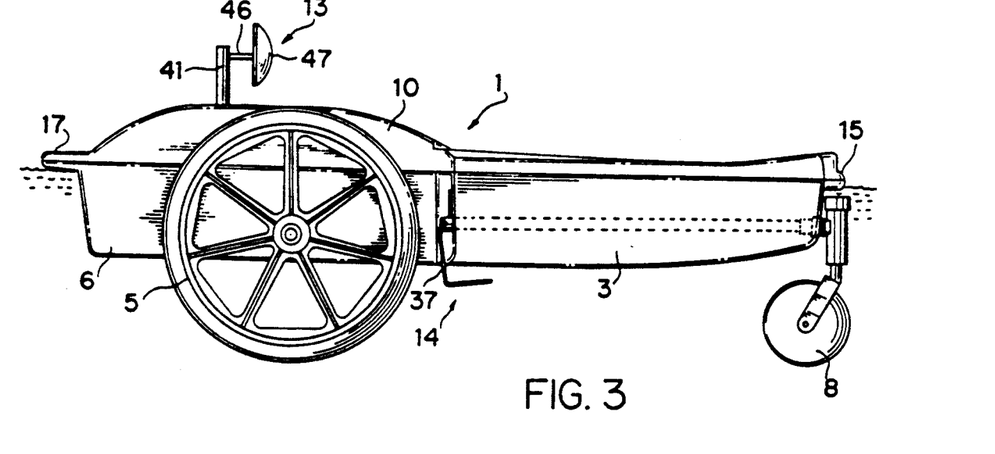
FIG. 3 is a side elevational view of the vehicle floating in a body of water.
Figure 4:
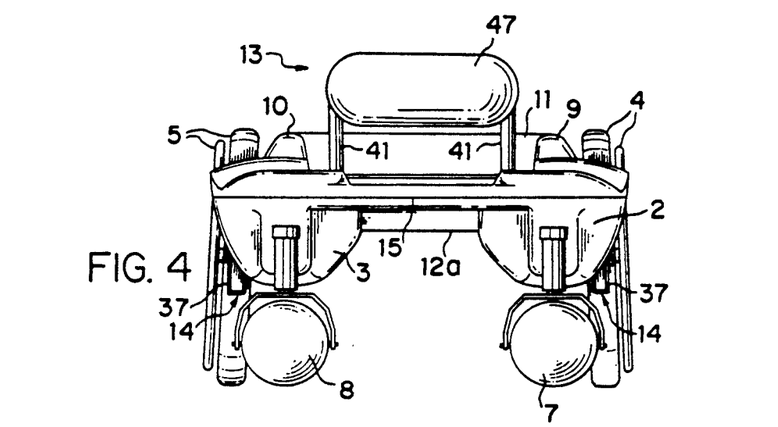
FIG. 4 is a front elevational view of the vehicle.
Figure 5:
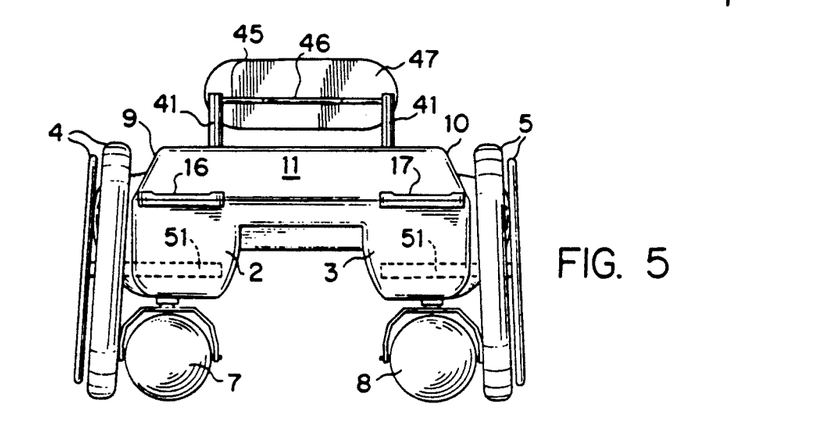
FIG. 5 is a rear elevational view of the vehicle.

Referring to the drawings and more particularly to FIGS. 1, 2 and 3, the amphibious mobility assist vehicle of the present invention comprises a main flotation body 1 having a catamaran configuration including twin, spaced, longitudinally extending hulls 2 and 3. A pair of conventional wheelchair-type wheels 4 and 5 are detachably connected to hulls 2 and 3 at the rear portion 6 of the main flotation body 1 on each side thereof and a pair of hollow, spherical, flotation, caster mounted wheels 7 and 8 are connected to the front of each hull 2 and 3.

Figure 6:
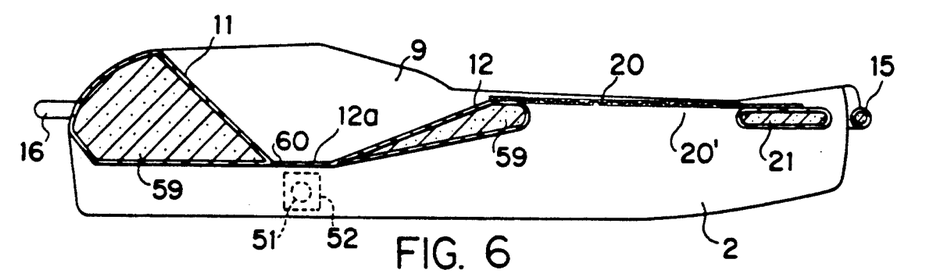
FIG. 6 is a longitudinal sectional view taken substantially along line 6—6 of FIG. 1.
Figure 7:
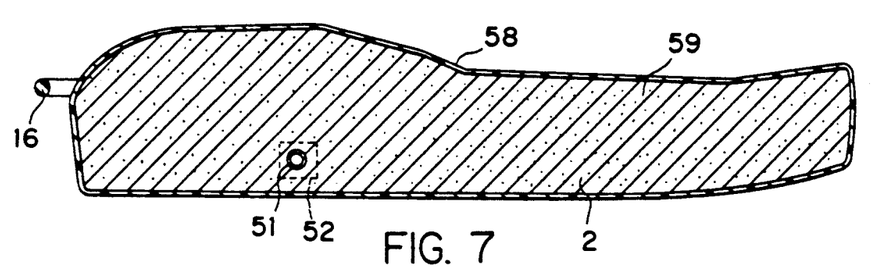
FIG. 7 is a longitudinal sectional view taken substantially along line 7—7 of FIG. 1.
Figure 8:
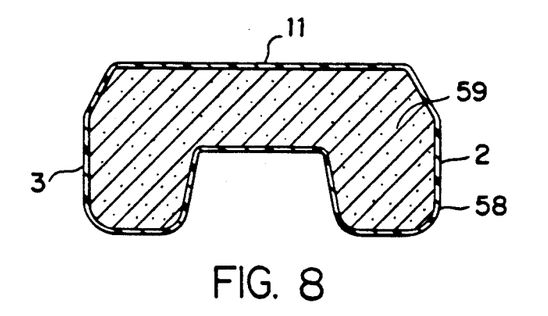
FIG. 8 is a cross-sectional view taken substantially along line 8—8 of FIG. 1.
Figure 9:
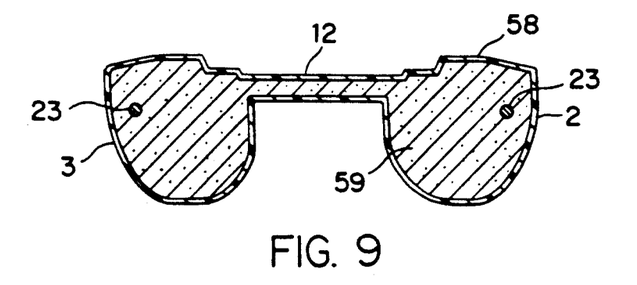
FIG. 9 is a cross-sectional view taken substantially along line 9—9 of FIG. 1.

The rear portion 6 of the main flotation body 1 is provided on the top with upwardly extending, inwardly tapered side walls 9 and 10, rear wall 11, front wall 12, and bottom wall 12a, as shown in FIGS. 1, 3 and 6, to thereby provide a seat for the occupant of the vehicle, in the top surface of the body. The seat also includes a foldable back rest 13, to be described more fully hereinafter.

Figures 10, 11:
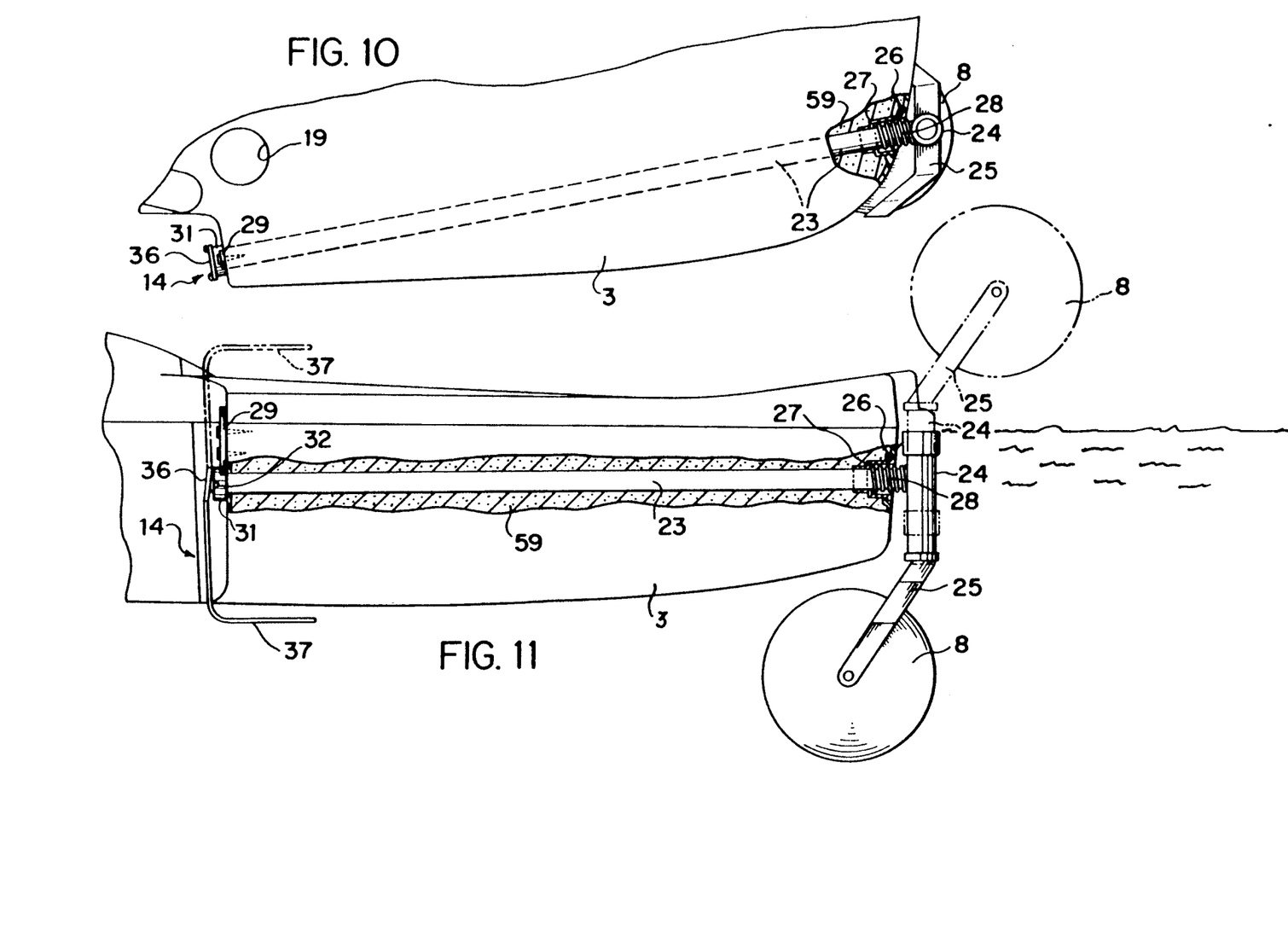
FIG. 10 is a fragmentary, top elevational view showing the mechanism for lifting and lowering one of the front spherical wheels.
FIG. 11 is a fragmentary, side elevational view of the mechanism shown in FIG. 10, and showing, in phantom, the spherical wheels in the elevated position.
Figures 14, 15:
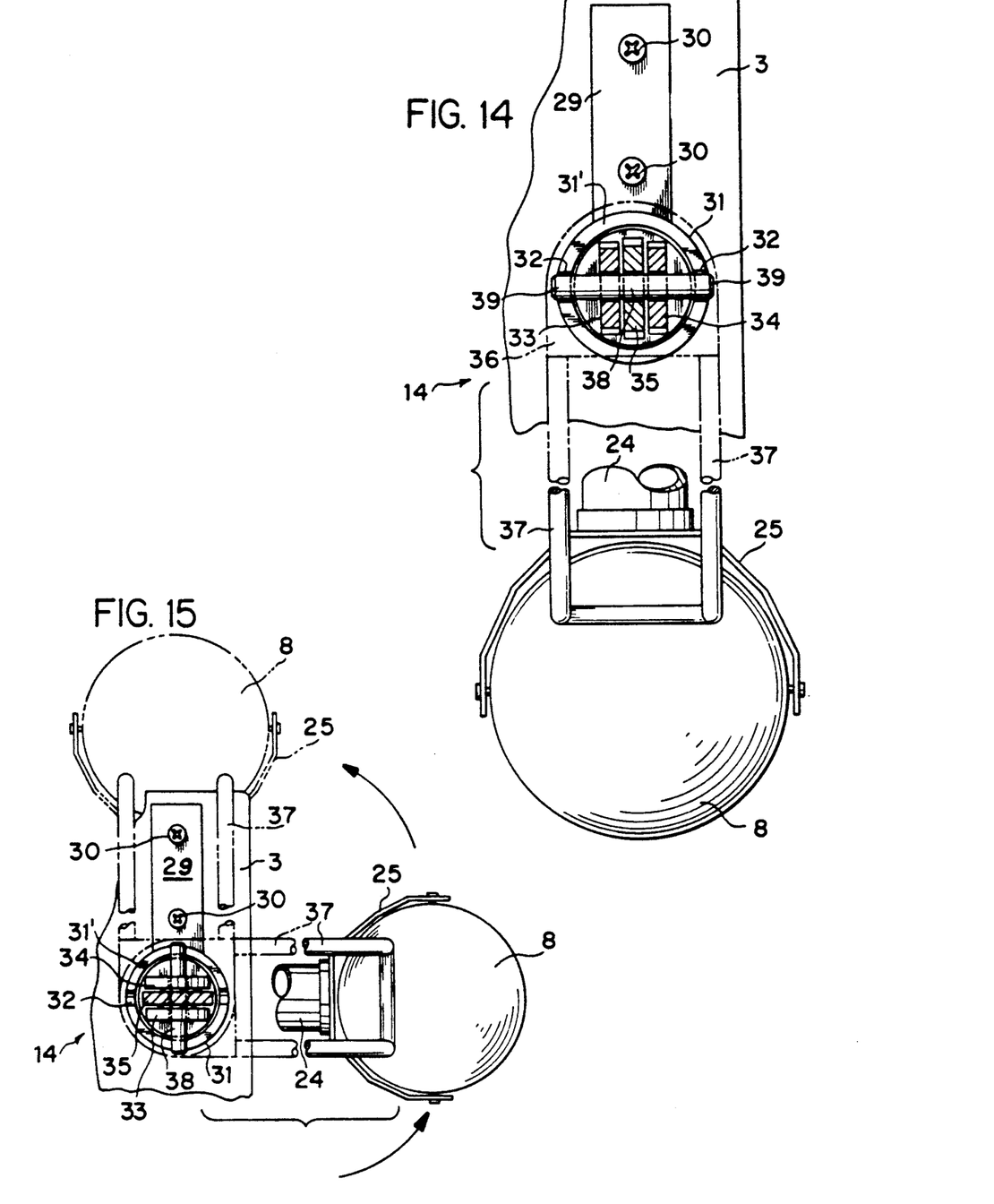
FIG. 14 is a view taken substantially along line 14—14 of FIG. 12, with part of the handle assembly shown in phantom and cross-section.
FIG. 15 is a view similar to FIG. 14 showing the positions of one of the spherical wheels when being moved from the ground engaging position of FIG. 14 to an elevated position, shown in phantom.

A manually actuated lift mechanism 14 is operatively connected to each spherical wheel 7 and 8 and accessible to the vehicle occupant, whereby the spherical wheels 7 and 8 can be pivoted from a ground engaging position, as shown in FIGS. 1-5, 10, 11 and 14, to an elevated position as shown in FIGS. 11 and 15, also to be described more fully hereinafter.

To complete the general description of the vehicle of the present invention, as will be seen in FIG. 1, a handle 15 is integrally connected to the front end portion of the vehicle, and a pair of handles 16 and 17 are integral with the back of the rear portion 6 of the vehicle, whereby the vehicle can be manually grasped and pulled over soft sand if required, and recesses 18 and 19 are provided in the hulls 2 and 3 in the vicinity of the seat and for holding beverage containers.

A mesh fabric 20 for supporting the legs of the vehicle occupant is provided in an open space 20' defined by the twin hulls 2 and 3, the front wall 12 of the seat and a transverse member 21 extending between and joining the forward portions of the hulls 2 and 3, the mesh fabric being secured in place by suitable snap fasteners 22, or the like.

Referring to FIGS. 10 to 15, the details of the lifting mechanism 14 associated with spherical wheel 8 are shown, and comprises a shaft 23 rotatably mounted in and extending longitudinally outwardly through the forward end of the hull 3. The end of the shaft 23 is integrally connected to the caster housing 24 which contains the spindle of the bifurcated arm 25 to which the wheel 8 is rotatably mounted. The forward end of the hull 3 through which the shaft 23 extends is provided with a bushing 26 having a shoulder 27 for supporting one end of a compression coil spring 28 having its opposite end biased against the caster housing 24, whereby a biasing force is imparted to the shaft 23 and associated caster housing 24 urging the shaft 23 and housing 24 in a forward direction.

Figure 12:
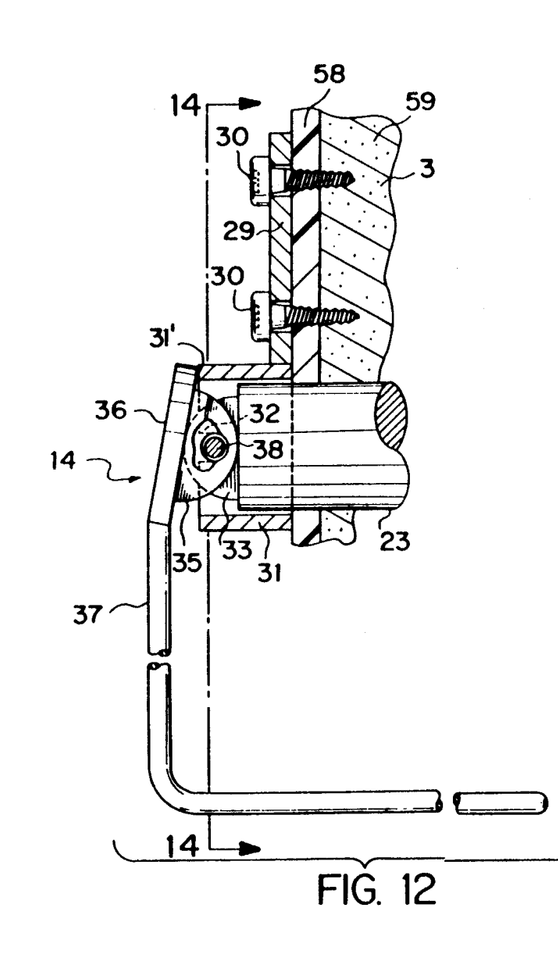
FIG. 12 is an enlarged fragmentary, side elevational view of the handle assembly employed in the spherical wheel actuation mechanism.
Figure 13:
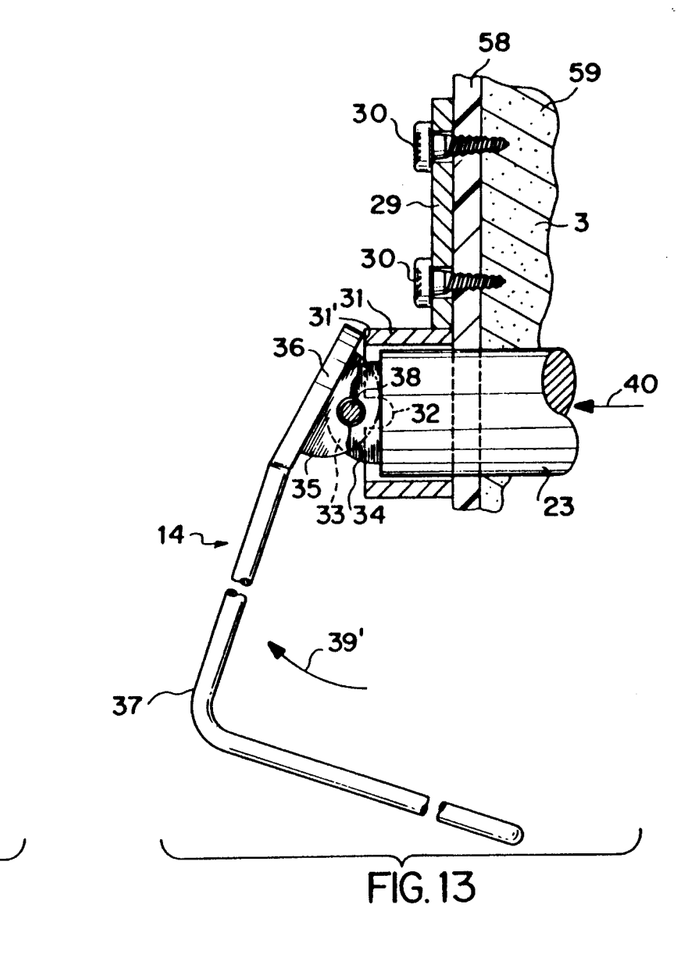
FIG. 13 is an enlarged, fragmentary, side elevational view of the handle assembly, shown in FIG. 12, manipulated to a position for actuating the spherical wheel.

As will be seen in FIGS. 12, 13 and 14 the opposite end of the shaft 23 is connected to an actuating handle and shaft guide assembly which comprises a plate 29 fastened to the rear end wall of hull 3 by suitable screws 30. The lower end of the plate 29 is provided with an integral, axially extending, cylindrical housing 31 having its forward end closed by the end wall of the hull and its opposite open end portion having a pair of diametrically opposed slots 32 formed in the housing side wall. The end portion of the shaft 23 extends into the cylindrical housing 31 and is provided with a pair of space integral apertured ear members 33, 34 extending axially therefrom, and having positioned therebetween an oppositely extending apertured ear member 35 integral with a plate member 36 integrally connected to a bent wire handle 37. A transversely extending pin 38 extends through the apertured ear members 33, 34, 35 and has its opposite end portions 39 normally seated in the cylindrical housing slots 32, under the biasing force of spring 28, to thereby lock the spherical wheel 8 in either the ground engaging position or elevated position, shown in phantom in FIGS. 11 and 15. To move the spherical wheel 8 from the ground engaging position as shown in solid lines in FIGS. 11 and 14, to the elevated position as shown in phantom in FIGS. 11 and 15, the wire handle 37 is manually grasped by the vehicle occupant, after the vehicle is floating in the water, and pulled rearwardly in the direction of the arrow 39' shown in FIG. 13, to thereby pivot handle plate member 236, about pin 38, into contact with the open end edge 31' of cylindrical housing 31, which then functions as a pivot to pull the shaft 23 axially rearwardly in the direction of arrow 40, whereby the coil spring 28 at the front of the shaft 23 is compressed to allow the opposite ends 39 of transverse pin 38 to be pulled outwardly from the cylindrical housing slots 32. The handle 37 and associated shaft 23 are then rotated 180° as shown in FIG. 15, during which movement the opposite ends of pin 38 slide on edge 31', until the outer end portions 39 of the pin 38 are once again aligned with the cylindrical housing slots 32. The handle 37 is released and the biasing force of the spring 28 causes the pin 38 to once again extend into the slots 32, to thereby lock the spherical wheel 8 in the elevated position.

To move the spherical wheel 8 from the elevated position to the ground engaging position, the handle 37 is pulled rearwardly as noted above but rotated in the opposite direction.

While the lift mechanism 14 has been described in connection with the spherical wheel 8, it will be understood that the same type of mechanism is employed for manipulation of spherical wheel 7, as shown in FIGS. 1, 2, 4 and 9.

Figure 16:
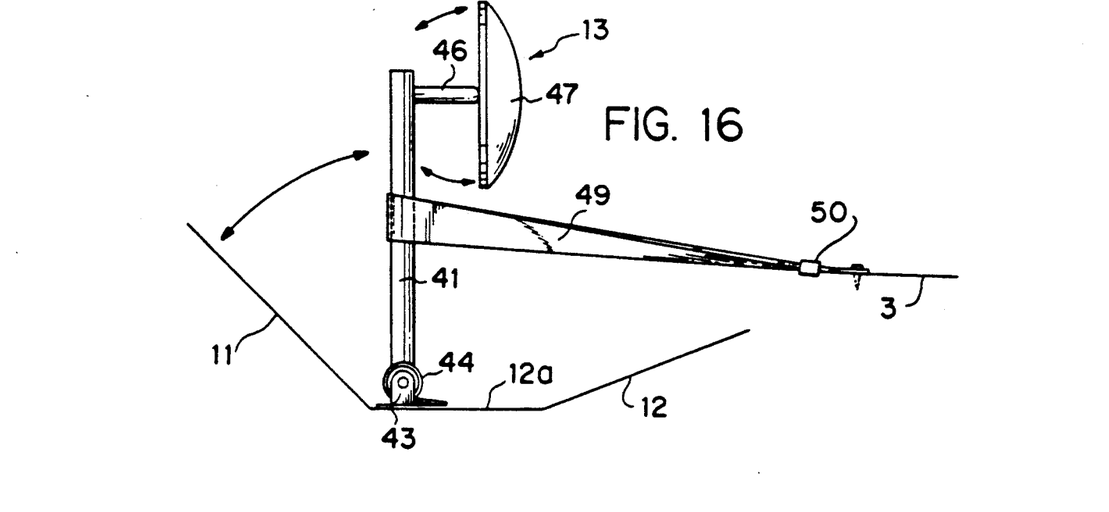
FIG. 16 is a side elevational view, partly in section, and partly schematic, showing the vehicle seat and associated back rest.
Figure 17:
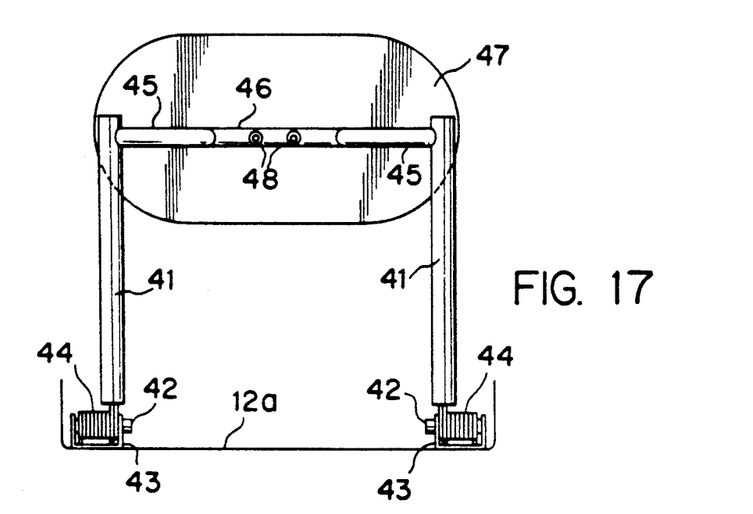
FIG. 17 is a rear elevational view of the back rest shown in FIG. 16.

Referring to FIGS. 16 and 17, the details of the construction of the foldable back rest 13 are illustrated and comprises a pair of spaced, parallel, upwardly extending tubular arms 41 having their lower end pivotally connected to a respective pin 42 mounted in a pair of spaced brackets 43 secured to the seat bottom wall 12a. Each pivot pin 42 extends through a coil torsion spring 44 having one end fixed to the bracket 43 and the other end extending upwardly into the tubular arm 41. The upper ends of the tubular arms 41 are interconnected by a transversely extending tubular member 45 having a medial portion 46, bent forwardly out of the plane of the arms 41, to which a back cushion 47 is fixedly connected at 48. The torsion springs 44 normally biases the back rest 13 to the folded position against the rear wall 11. To hold the backrest 13 upwardly to a position suitable for the occupant of the vehicle, a retainer such as a strap 49 is provided which extends around the arms 41 and forwardly to the hulls 2 and 3 and connected thereto by an adjustable buckle 50, as shown schematically in FIG. 16.

Figure 18:
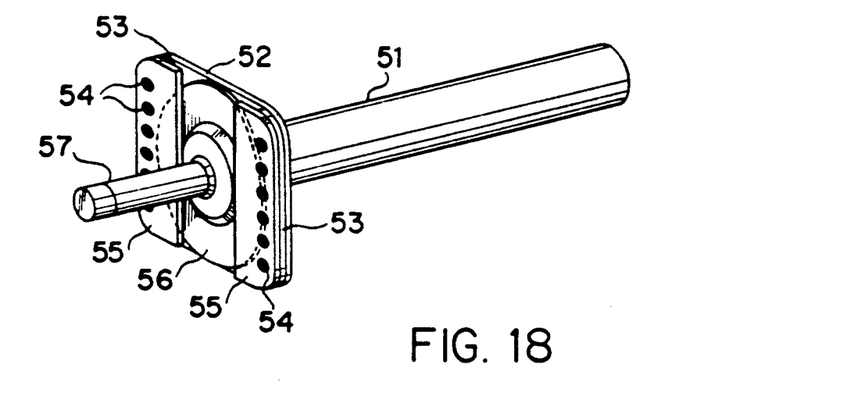
FIG. 18 is a perspective view of one of the stub axle assemblies upon which the rear wheels of the vehicle are mounted.

FIG. 18 illustrates each axle assembly upon which the rear wheels 4 and 5 are rotatably mounted, and comprises a fixed shaft 51 extending inwardly into the rear portions of the hulls 2 and 3, as shown in FIGS. 2, 5, 6 and 7. The outer edge of each shaft 51 is provided with an integral rectangular stainless steel plate 52 which is adapted to abut the exterior vertical surface of each hull 2 and 3. A pair of spaced plastic plates 53 abuts the outer face of the stainless steel plate 52 and is secured thereto by a plurality of stainless steel flat head screws 54 extending through a pair of spaced stainless steel outer plates 55, to thereby form am adjustable friction slot for receiving a separate circular hub plate 56 fixedly connected to one end of a stub shaft 57 upon which the rear wheels 4 and 5 are rotatably mounted, and held thereon by a quick disconnect connection, of known type (not shown). The shafts 51 and plates 52 are inserted into the hulls after they are molded and are held in position on the hulls by the thermoplastic foam filling 59, to be described, and the screws 54. The plastic plates 53 facilitate the insertion of the hub plate 56 into the slot in the plane of the plastic plates 53, and after insertion the screws 54 are further tightened.

To complete the structural description of the vehicle of the present invention, it is constructed of a molded shell 58 of plastic material, such as high-density cross-linked polyethylene, filled with lightweight polyurethane foam 59, or other suitable thermoplastic material of closed cell construction. The main flotation body 1 thus has a plastic skin or outer surface 58 that is water impervious, and the vehicle is provided with suitable water drain holes such as shown at 60 in FIGS. 1 and 2.

In using the mobility assist vehicle 1 of the present invention, the front spherical wheels 7 and 8 are initially in the lowered ground engaging position so that the mobility impaired person can transfer to the vehicle from a wheelchair, or the like, and after occupying the vehicle can manipulate the rear wheels 4 and 5, as in a regular wheelchair, to propel the vehicle over the ground to the water's edge. The occupant sits upon front wall portion 12, or on a cushion on front wall 12, with the occupant's legs stretched out in front so that the calves of the legs, etc., are supported by the mesh fabric 20. If sand is encountered which too soft to manually propel the vehicle 1, assistance can be given to the occupant of the vehicle by a person grasping handles 15 or 16 and 17 and pushing or pulling the vehicle to the water's edge. After the vehicle is water borne, as shown in FIGS. 3 and 11, the rear wheels 4 and 5 can remain on the vehicle, and the forward spherical wheels 7 and 8 can remain in the lowered position to add buoyancy to the vehicle; however, if desired, the occupant of the vehicle can remove the rear wheels 4 and 5 by reaching down and releasing the quick disconnect connectors (not shown), and store the wheels in the vehicle 1 behind the backrest 13, and the front spherical wheels 7 and 8 can be pivoted to the elevated position as shown in phantom in FIGS. 11 and 15 by manipulation of the lift mechanism 14 described hereinabove. This removes water drag, and the raised front spherical wheels act as stabilizers against tipping of the vehicle if the occupant leans forward or to the sides. With such movements the hollow spherical wheels can move into contact with the water and provide additional stabilizing buoyancy by functioning as stabilizing outrigger pontoons. The occupant of the vehicle propels the vehicle through the water by employing a suitable paddle, such as a kayak paddle. During use, water self-bales from the seat portion of the vehicle through water drain hole 60, and when it splashes onto the forward portion of the vehicle and onto the occupant's outstretched legs, it drains down through the mesh fabric 20 and open space 20' to between the forward portions of hulls 2 and 3.

From the above description it will be readily appreciated by those skilled in the art that the mobility assist vehicle of the present invention provides an improved rough terrain, amphibious, wheeled vehicle whereby a mobility impaired person can obtain access to aquatic environments with dignity, to thereby enjoy various aquatic sports, such as, water polo, fishing, kayaking, sailing, and the like.

The terms and expressions which have been employed herein are used as terms of description and not of limitation, and there is no intention, in the use of such terms and expressions, of excluding any equivalents of the features shown and described or portions thereof, but it is recognized that various modifications are possible within the scope of the invention claimed.

I claim:

1. An amphibious mobility assist vehicle for mobility impaired persons, comprising a main flotation body, a pair of buoyant wheel assemblies connected to the front of and extending forwardly of the main flotation body for supporting the vehicle on the ground and in the water, a pair of ground engaging wheels detachably connected to the rear of said main flotation body, a seat portion provided in the rear portion of said flotation body and positioned between the rear wheels, and a lift mechanism extending from the vicinity of the seat portion and operatively connected to each of the buoyant wheel assemblies, whereby an occupant of the vehicle can manipulate the lift mechanism, to thereby move the buoyant wheel assemblies from a ground engaging position to an elevated position forwardly of and above the front of the main flotation body when the vehicle is floating in a body of water.

2. An amphibious mobility assist vehicle according to claim 1, wherein the main flotation body is constructed of a molded shell of thermoplastic material, and a foam plastic material of closed cell construction filling said molded shell.

3. An amphibious mobility assist vehicle for mobility impaired persons, comprising a main flotation body having a catamaran configuration including a pair of twin, spaced, longitudinally extending hulls, a pair of buoyant wheel assemblies, one buoyant wheel assembly connected to the front of one hull, and the other buoyant wheel assembly connected to the front of the other hull, for supporting the vehicle on the ground and in the water, a pair of ground engaging wheels detachably connected to a respective hull at the rear portion of said main flotation body, a seat portion provided in the rear portion of said flotation body and positioned between the rear wheels, and a lift mechanism extending from the vicinity of the seat portion and operatively connected to each of the buoyant wheel assemblies, whereby an occupant of the vehicle can manipulate the lift mechanism, to thereby move the buoyant wheel assemblies from a ground engaging position to an elevated position when the vehicle is floating in a body of water.

4. An amphibious mobility assist vehicle according to claim 3, wherein said lift mechanism includes a lift mechanism for each buoyant front wheel assembly, each lift mechanism comprises, a shaft rotatably mounted in the hull and having one end extending longitudinally outwardly of the front of the hull, a buoyant wheel assembly connected to the outwardly extending end of the shaft, said shaft having an opposite end extending outwardly from the hull in the vicinity of the seat portion of the vehicle, and an actuating handle assembly connected to said opposite end of said shaft, whereby the occupant of the vehicle can grasp each actuating handle assembly and rotate each shaft to thereby move each buoyant front wheel from the ground engaging position to the elevated position, and from the elevated position back to the ground engaging position.

5. An amphibious mobility assist vehicle according to claim 4, wherein the actuating handle assembly comprises, an open ended cylindrical housing mounted on said hull, a pair of diametrically opposed slots provided in the peripheral edge of the housing side wall adjacent the open end thereof, the opposite end of said shaft extending through said housing and the open end thereof, at least one apertured ear member integral with the opposite end of said shaft, handle means, an apertured ear member connected to said handle means and positioned in side-by-side relationship to the first mentioned apertured ear member on the opposite end of said shaft, a transversely extending pin extending through said apertured ears, said pin having opposite end portions seated in said pair of slots, and spring means mounted between the front of the hull and the buoyant wheel assembly for biasing the wheel assembly in a direction forwardly of the front of the hull to thereby hold the opposite end portions of the pin in the slots to lock the buoyant front wheels in a selected position, whereby the occupant of the vehicle can move the buoyant front wheels from one position to another by pulling the handle means in a direction opposite to the biasing force of the spring means, to thereby pull the pin out of the slots, whereby the shaft can be rotated to re-position the buoyant front wheels.

6. An amphibious mobility assist vehicle according to claim 5, wherein the spring means comprises a coil spring mounted between the front of the hull and the buoyant wheel assembly, said one end of said shaft extending through said coil spring.

7. An amphibious mobility assist vehicle according to claim 5, wherein said at least one apertured ear member comprises a pair of spaced apertured ear members integral with the opposite end of said shaft, the handle means comprises, a bent wire handle, a plate integral with said wire handle, an apertured ear member integral with said plate and extending outwardly therefrom and positioned between said pair of spaced apertured ear members on the opposite end of said shaft, said pin extending through all of the apertured ear members.

8. An amphibious mobility assist vehicle according to claim 5, wherein said at least one apertured ear member comprises a pair of spaced apertured ear members integral with the opposite end of said shaft, said handle means including a plate, an apertured ear member integral with said plate and extending outwardly therefrom and positioned between said pair of spaced apertured ear members on the opposite end of said shaft, said pin extending through all of the apertured ear members.

9. An amphibious mobility assist vehicle according to claim 4, wherein each buoyant wheel assembly comprises a hollow sphere, a bifurcated arm, the hollow sphere being positioned between and rotatably mounted to the branches of the bifurcated arm, the arm providing a spindle extending into a caster housing, said one end of said shaft being connected to said caster housing.

10. An amphibious mobility assist vehicle according to claim 3, wherein the seat portion includes a bottom wall and a foldable back rest assembly, comprising at least one upwardly extending arm, the lower end of said arm being pivotally connected to said bottom wall, a back cushion mounted on the upper end portion of the arm, spring means operatively connected to said arm for biasing said arm and associated back cushion to a folded position, and retainer means connectable to the arm for holding the arm and associated back cushion at a position suitable to the occupant of the vehicle.

11. An amphibious mobility assist vehicle according to claim 3, wherein the main flotation body is constructed of molded thermoplastic material of closed cell construction.

12. An amphibious mobility assist vehicle according to claim 3, wherein a mesh fabric is positioned in the space between the twin hulls and detachably connected to the hulls, whereby the legs of the occupant of the vehicle are supported by the mesh fabric.

13. An amphibious mobility assist vehicle according to claim 3, in which said pair of twin spaced hulls defining an open space therebetween and forwardly of said seat portion, and a leg supporting mesh fabric covering said open space and connected to said hulls.

14. An amphibious mobility assist vehicle for mobility impaired persons, comprising a main flotation body, a pair of buoyant wheel assemblies connected to the front of the main flotation body for supporting the vehicle on the ground and in the water, a pair of ground engaging wheels each detachably connected to the rear of said main flotation body by an axle assembly comprising a fixed shaft extending inwardly into the rear portion of the main flotation body, a plate integral with one end of said fixed shaft and abutting an external vertical surface of said main flotation body, a pair of spaced spacer plates abutting the outer face of said plate, a pair of spaced outer plates abutting said spacer plates and securing said spacer plates to the first mentioned plate, a stub shaft, a hub integral with one end of said stub shaft, said hub being slidably mounted into the space between said spacer plates, a said ground engaging rear wheel rotatably mounted on said stub shaft, a seat portion provided in the rear portion of said flotation body and positioned between the rear wheels, and a lift mechanism extending from the vicinity of the seat portion and operatively connected to each of the buoyant wheel assemblies, whereby an occupant of the vehicle can manipulate the lift mechanism, to thereby move the buoyant wheel assemblies from a ground engaging position to an elevated position when the vehicle is floating in a body of water.

15. An amphibious mobility assist vehicle for mobility impaired persons, comprising a main flotation body, a pair of buoyant wheel assemblies connected to the front of the main flotation body for supporting the vehicle on the ground and in the water, a pair of ground engaging wheels detachably connected to the rear of said main flotation body, a seat portion provided in the rear portion of said flotation body and positioned between the rear wheels, and a lift mechanism extending from the vicinity of the seat portion and operatively connected to each of the buoyant wheel assemblies, said lift mechanism including resiliently biased indexing means for locking said buoyant wheel assemblies in the ground engaging position and in the elevated position, whereby an occupant of the vehicle can manipulate the lift mechanism to thereby move the buoyant wheel assemblies from a ground engaging position to an elevated position when the vehicle is floating in a body of water.

16. An amphibious mobility assist vehicle for mobility impaired persons, comprising a main flotation body, a pair of buoyant wheel assemblies connected to the front of the main flotation body for supporting the vehicle on the ground and in the water, a pair of ground engaging wheels detachably connected to the rear of said main flotation body, a seat portion provided in the rear portion of said flotation body and positioned between the rear wheels, and a lift mechanism including axis means extending substantially longitudinally of said main flotation body from the vicinity of the seat portion and operatively connected to each of the buoyant wheel assemblies, whereby an occupant of the vehicle can manipulate the lift mechanism, to thereby move the buoyant wheel assemblies about said longitudinally extending axis means from a ground engaging position to an elevated position when the vehicle is floating in a body of water.

17. An amphibious mobility assist vehicle according to claim 16, wherein said buoyant wheel assemblies include buoyant spherical wheel means.

* * * * *